US009735618B2

United States Patent
Kanarellis et al.

(10) Patent No.: US 9,735,618 B2
(45) Date of Patent: Aug. 15, 2017

(54) SYSTEM AND METHOD FOR SUPPLYING UNINTERRUPTED POWER TO A POE DEVICE WITH ACTIVE POWER NEGOTIATION AND EXTENDED RANGE

(71) Applicant: BTU RESEARCH LLC, Houston, TX (US)

(72) Inventors: Michael Kanarellis, Houston, TX (US); Charles I. McAndrew, Magnolia, TX (US)

(73) Assignee: BTU RESEARCH LLC, Houston, TX (US)

( * ) Notice: Subject to any disclaimer, the term of this patent is extended or adjusted under 35 U.S.C. 154(b) by 0 days.

(21) Appl. No.: 15/201,474

(22) Filed: Jul. 3, 2016

(65) Prior Publication Data

US 2016/0315500 A1    Oct. 27, 2016

Related U.S. Application Data

(62) Division of application No. 14/135,050, filed on Dec. 19, 2013, now Pat. No. 9,385,562.

(51) Int. Cl.
| | |
|---|---|
| *H02J 7/00* | (2006.01) |
| *H02J 9/00* | (2006.01) |
| *H02J 9/06* | (2006.01) |
| *H04L 12/10* | (2006.01) |

(52) U.S. Cl.
CPC ............. *H02J 9/061* (2013.01); *H02J 7/007* (2013.01); *H02J 9/00* (2013.01); *H04L 12/10* (2013.01); *Y10T 307/625* (2015.04)

(58) Field of Classification Search
CPC .......... H02J 9/00; H02J 9/061; Y10T 307/625
USPC ........................................................... 307/66
See application file for complete search history.

(56) References Cited

U.S. PATENT DOCUMENTS

| | | | |
|---|---|---|---|
| 6,862,353 B2 | 3/2005 | Rabenko et al. | |
| 7,081,827 B2 | 7/2006 | Addy | |
| 7,286,556 B1 | 10/2007 | Jackson | |
| 7,325,150 B2 | 1/2008 | Lehr et al. | |
| 7,478,251 B1 | 1/2009 | Diab et al. | |
| 7,872,378 B2 | 1/2011 | Lo | |
| 8,386,832 B2 | 2/2013 | Karam et al. | |
| 8,595,550 B1 | 11/2013 | Heath et al. | |
| 2006/0186739 A1 | 8/2006 | Grolnic et al. | |
| 2007/0283173 A1* | 12/2007 | Webb | G06F 1/305 713/300 |

(Continued)

*Primary Examiner* — Carlos Amaya
(74) *Attorney, Agent, or Firm* — Andrew W. Chu; Craft Chu PLLC

(57) ABSTRACT

A system and method for supplying uninterruptible power has active power negotiation and an extended range. The system includes a housing, a power supply input, a power source equipment input, a powered device output, an alternative power supply, and a control module. The control module includes a comparator, a switch, a converter, and an injector. The injector includes a regulator and power auto-negotiation module. The injector actively manages the power to the powered device, even when the PoE available from older power source equipment differs from the PoE requirements of an updated powered device. There can also be an Ethernet switch as a power source equipment extension between the powered device and the system. The Ethernet switch extends the range of the powered device from the system.

18 Claims, 3 Drawing Sheets

(56) References Cited

U.S. PATENT DOCUMENTS

2008/0073977 A1    3/2008  Grolnic et al.
2009/0243391 A1  10/2009  Susong, III et al.
2012/0080944 A1    4/2012  Recker et al.
2014/0139664 A1    5/2014  Herzel

* cited by examiner

SYSTEM AND METHOD FOR SUPPLYING UNINTERRUPTED POWER TO A POE DEVICE WITH ACTIVE POWER NEGOTIATION AND EXTENDED RANGE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to system and method for supplying uninterruptible power to a Power-over-Ethernet (PoE) device. More particularly, the present invention relates to a system with an active injector connected to a power supply input, an alternative power supply, and a power source equipment input as the PoE power. The present invention relates to an uninterrupted power supply for a powered device in an extended remote location by an emergency PoE back-up power supply at the location of the powered device.

2. Description of Related Art Including Information Disclosed Under 37 CFR 1.97 and 37 CFR 1.98.

A "Power over Ethernet" device is a powered device that works on electrical power supplied by an Ethernet cable. Power over Ethernet ("PoE") describes a technique to deliver electrical power via Ethernet cabling. A single cable transmits data and electrical power to devices, such as IP security cameras, network webcams, wireless access points, VoIP phones, network routers and others. There is no need for a separate power source for the PoE device. IEEE PoE standards set signaling standards for power source equipment, the actual power source, and the powered device, so that the powered devices and power source equipment can communicate. The power source equipment and powered device detect each other and regulate the amount of power supplied to the PoE device. By IEEE PoE standards, there is only a limited power transmission available through an Ethernet cable.

An uninterruptible power supply "("UPS"), or uninterruptible power source, provides emergency power to a powered device when the main power source is disrupted. The UPS is an immediate and generally instantaneous alternative power supply available as soon as the main power source fails. In contrast, a standby or emergency system is a separate power source, which must be activated and then switched over to supply the powered device. The immediacy and lack of delay are important for sensitive electronic equipment and continuous data processing.

The UPS protects powered devices from loss of data, loss of status information related to the powered device, and the subsequent costs associated with repair and resetting of the powered device. Those extra costs avoided can include delays in data processing, sending technicians off site to the location of the powered device, and loss of revenue from downtime of the system. UPS also prevents disruption of the software of a powered device. An unexpected loss of power may necessitate a re-boot or restart of the system, causing more delay and downtime beyond the downtime caused by the disruption of power.

In the prior art, the UPS has been an alternate power switch, activated as soon as a power disruption is detected. A switch changes the regular power supply to an alternative power source, such as a battery. Critical devices, such as heart monitors and breathing machines in a hospital room, may cease to function with an unexpected loss of power. The UPS intervenes during these moments to eliminate all the associated equipment and network downtime.

Various patents and publications are available in the field of uninterruptible power supplies. United States Patent Application No. 2012/0080944, published by Recker, et al. on Apr. 5, 2012, discloses a method and system that, in relevant part, keep a lighting grid functional in the absence of power. An intelligent control device, a wall switch, for instance, and a lighting grid must be wired to communicate with each other and have individual battery backups. When the intelligent control device identifies a power outage, it communicates to those devices with their own backups on the grid to adjust to motion and environment, as well as to change intensity and color.

For PoE devices, the incorporation of a UPS is complicated because of coordination between the power supply and the powered device. The PoE device is typically far removed from the actual power supply, such as an AC power outlet. A disruption in the AC power at the power outlet affects the power source equipment, not the PoE device. The UPS for the power source equipment is the prior art system of a battery or alternate power supply with an instantaneous switch. There is no UPS for a PoE device because the PoE device has no power cord to a power supply, as in the prior art.

United States Patent Application No. 2009/0243391, published by Susong, III, et al. on Oct. 1, 2009, describes a power supply designed to provide power to networking utilities such as routers and switches. The power supply accepts alternating current, converts it to direct current, and powers at least one PoE port. The power source also includes an internal battery backup, and redundancies to make sure the power remains continuous. In order to provide continuous power, the device includes a failover communication interface between the main power supply and a backup source operating in an off-line mode. The failover interface detects when the main power source has been interrupted, at which time the backup source becomes the on-line source to provide power to the device.

U.S. Pat. No. 7,286,556, issued to Jackson on Oct. 23, 2007, discloses a system and method for delivering power to a number of devices attached to a central networking device. The central networking device delivers power over an Ethernet network, and can provide backup power to those devices on the network that would normally not warrant multiple redundant power sources. The system discloses delivery of power over a cable with different wires for data and power, or over the same cable using different frequencies and filters to maintain the integrity of the signals.

The prior art systems for providing UPS for a PoE device fail to address the separation between the power source equipment and PoE devices. For example, remote network webcams connect by Ethernet cables for the power and data transmission to a control center. The control center is located miles away and monitors multiple network webcams in other locations far and near. The prior art systems provide UPS for the control center as the power source equipment for the remote network webcams. The advance prior art systems relate to prioritizing which PoE devices continue to receive power during an outage at the control center as the power source equipment. There is no disclosure of any power supply issue at the location of the PoE device. Local power management is an unnecessary redundancy of the control center management of the prior art.

However, not all remote network webcams can use the control center as power source equipment. Over long distances, the voltage necessary to transfer power and data from the control center to each remote network webcam is too high for Ethernet cables. The capacity of the Ethernet cable is insufficient to power remote PoE devices in many instances. Voltage drops or current fluctuations are created by resistance build-ups over lengthy power runs through Ethernet cables. Traditional PoE injectors overcome the long distance and Ethernet cable capacity issues. The PoE injector connects local AC power to the PoE device, concurrent with the data transmission between the control center and the PoE device. The prior art UPS systems for PoE devices do not address the injector-based systems for extensive and wide networks. Power disruptions at the local level of the injector and PoE device continue to affect systems with widespread PoE devices. A localized power outage can still disrupt PoE devices within an overall network, even as UPS prior art protects the control center. Prior art UPS systems have not yet addressed the expansion of PoE devices in wide and remote networks.

Additionally, PoE devices rely on passive injectors. The amount of power received from the PoE device is the amount of power received as a pass-through the available cables. There is no active management of the amount of power in order to support the powered device. The system is limited to the length of cable between the power source equipment and the powered device because the amount of power passed through controlled the power available to the powered device. The systems with old cables and old power source equipment having previous PoE standards (such as IEEE 802.3af) would never be able to pass through sufficient power for the powered devices that require the updated PoE standards, such as IEEE 802.3at. The account for technology upgrades to the physical constraints of the equipment, there is a need for a system to actively set the threshold for the powered device output.

Further mechanical limitations include the length of cable. The range of the network cannot be extended due to the inherent limitation of 100 m per segment of CAT-5 based Ethernet cables. There is a need to extend the range, while maintaining the 10/100/1000 base-T functionality. The powered device must maintain connections from the control center of the network to the remote location of the system and from the location of the system to the powered device.

It is an object of the present invention to provide embodiments of a system and method for supplying uninterruptible power to a PoE device.

It is an object of the present invention to provide embodiments of a system and method for supplying uninterruptible power from any PoE power source equipment at a predetermined amount according to a selected PoE device.

It is an object of the present invention to provide embodiments of a system and method for supplying uninterruptible power to a PoE device at an extended range from the system.

It is another object of the present invention to provide embodiments of a system and method for supplying uninterruptible power to a PoE device through an injector with a power autonegotiation module and regulator.

It is still another object of the present invention to provide embodiments of a system and method for supplying uninterruptible power to a PoE device through an Ethernet switch between the PoE device and the PoE power source equipment.

It is still another object of the present invention to provide embodiments of a system and method for supplying uninterruptible power to a PoE device through an Ethernet switch between the PoE device and the system.

It is yet another object of the present invention to provide embodiments of a system and method for supplying uninterruptible power to a PoE device at a location remote from a control center and the system.

These and other objectives and advantages of the present invention will become apparent from a reading of the attached specifications and appended claims.

BRIEF SUMMARY OF THE INVENTION

Embodiments of the present invention include a system for supplying uninterruptible power for a Power over Ethernet (PoE) device. In particular, the PoE device is remotely located from the control center of the overall network of PoE devices, and the power source for the control center is separate from each PoE device. The only power from the control center or from intervening power source equipment is transmitted by Ethernet cabling. The intervening power source equipment can be a router or network switch. The PoE device is required to source power from a more local source, while still transmitting and using data and power from the Ethernet cable. In embodiments of the present invention, the system includes a housing, a power supply input on the housing, a power source equipment input on the housing, a powered device output on the housing, an alternative power supply within the housing, and a control module within the housing. The housing is a separate unit attached between the Ethernet cabling from the control center to the powered device, the PoE device, at the location of the powered device. For example, a wall outlet near the powered device plugs into the housing at the power supply input, even though the wall outlet is separate from the power supplied through the power source equipment and control center.

On the housing, the power supply input can be a Power Supply (PS) interface. The interface can be a wall socket connection for a power cord. A power cord connects to an AC power source, such as a wall outlet. The power source equipment input, and the powered device output can have interfaces as Ethernet ports. Ethernet cables for power and data connect these devices to the housing. Power source equipment may include a PoE network switch, a non-PoE network switch, a computer network, and other power and data sources. The powered device is a PoE device, such as a wireless router, a network webcam, a voice over Internet Protocol (VoIP) telephone, a wireless access point, a camera, and a data processor.

Within the housing, the alternative power supply can be a means for storing energy, such as a battery or plurality of batteries. In some embodiments, the alternative power supply is a lithium ion battery. The alternative power supply can also be a chemically activated recharging supply, so that the alternative power supply actively stores power supplied by the system. For example, the alternative power supply can store the power from the power source equipment input by Ethernet cable and/or from the power supply input by a power cord.

Embodiments of the present invention also include the control module connected to the power supply input, the power source equipment input, the powered device output, and the alternative power supply. The control module manages the power and data received and distributed to the housing. Embodiments include the control module being comprised of an injector means, a comparator means, a switch means, and a converter means. The comparator means connects incoming power to be distributed to the powered device, whether the power comes from the power supply input, the alternative power supply or the power source equipment. The converter means transfers AC power from the power supply to DC power for use in the system. The switch means directs collection of power from either the power supply input or the alternative power supply or the power source equipment or any combination thereof to the injector means for distribution. The injector means distributes collected power to the powered device. The injector means includes a regulator and power autonegotiation module. The power autonegotiation module sets the threshold amount of power to be provided to the powered device, without regard to the passive pass-through power from the power source equipment input. The regulator can collect the necessary power from the different sources to maintain the threshold amount of power. There can also be an auxiliary power supply connected directly to the regulator as another power source to maintain the threshold amount of power.

In some embodiments, the control module is comprised of a battery charger, storing power from the power supply input and the power source equipment. The battery charger maintains the power in the alternative power supply. Another embodiment includes the power source equipment extension between the powered device output and the powered device. The power source equipment extension can be an Ethernet switch to extend the physical range of the powered device beyond the physical limitation of an Ethernet cable.

There can be various modes of operation in embodiments of the system. The control module actively manages the PoE from the power source equipment for a powered device, instead of relying on available power passing through the power source equipment. The power negotiation module sets a predetermined amount of voltage to the powered device output according to the powered device. The method accounts for updated powered devices with different PoE requirements, even when the existing network of power source equipment may have older PoE capacity and physical limitations. The power supply input as the localized power is the default power source through the regulator of the injector means. When insufficient power is detected by the power autonegotiation module of the injector, the regulator activates to collect power from the power supply input and at least one other power source, selected from the alternative power supply, the converter means, and the power source equipment input. Any disruption in the power to the powered device is avoided by actively managing the power sources. When the disruption is resolved and when the power supply input is able to supply power within the threshold range, the regulator signals the switch to change back to the previous collection from the power supply input and the other power sources. In this manner, the PoE from any power source equipment and the alternative power supply can be available for repeated use, and the alternative power supply can be charged in other steps of the method of the embodiments of the present invention.

DETAILED DESCRIPTION OF THE INVENTION

Figure 1:
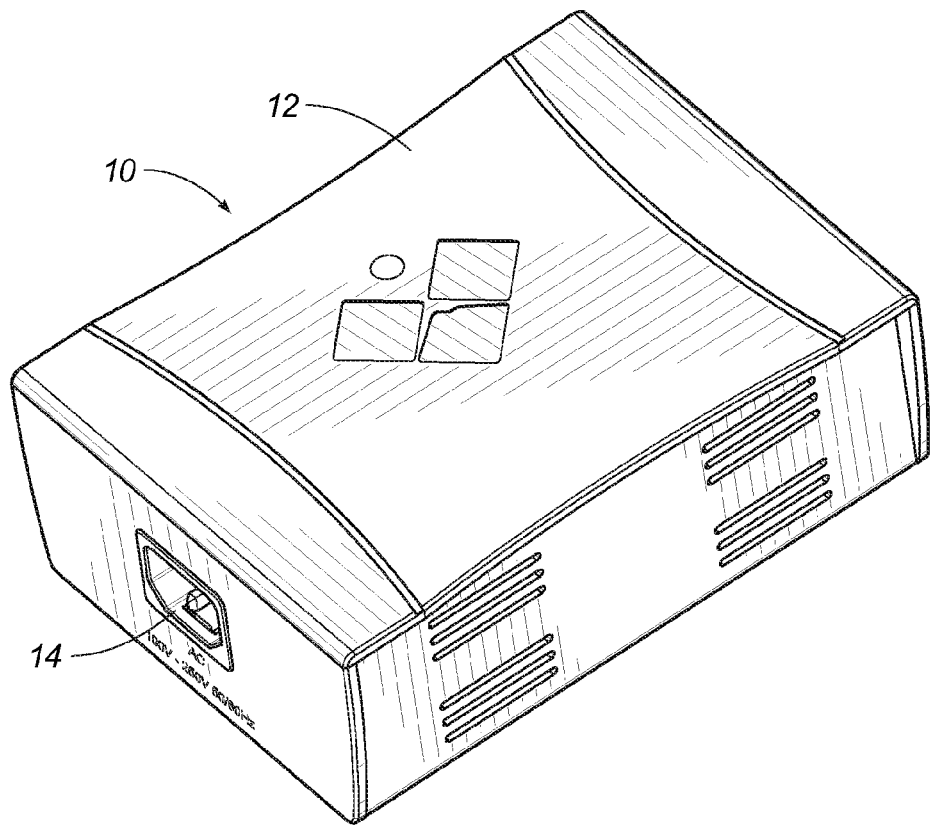
FIG. 1 is an upper perspective view of an embodiment of the system for supplying uninterruptible power, according to the present invention.

Referring to FIGS. 1-6, embodiments of the system 10 for supplying uninterruptible power are shown. The system 10 includes a housing 12, a power supply input 14, a power source equipment input 16, a powered device output 18, an alternative power supply 20, and a control module 22. FIGS. 1-4 show the housing 12 as a separate unit for placement at a location of the powered device or PoE device. The PoE device is remotely located from a control center of the overall network of PoE devices, and the power source for the control center is separate from each PoE device. The PoE device relies on the data transmission back and forth through the network from the control center. The only power from the control center or from intervening power source equipment is transmitted by Ethernet cabling. Because of the physical restraints of Ethernet cabling, not much power is transmitted to the system 10. The Ethernet cabling engages the power source equipment input 16, supplying primarily data and some power. There may be some power transmitted from the power source equipment through the power source equipment input 16, but that power is not generally sufficient to run the PoE device. As such, the intervening power source equipment can be a router or network switch. The PoE device is required to source power from a more local source, while still transmitting and using data and the bit of power from the power source equipment input 16. Ethernet cabling originating from the control center can connect to the power source equipment input 16, which connects the system 10 into the overall network of data.

FIGS. 1-4 also show the power supply input 14, which actually supplies the power for the system 10 and the powered device output 18 for the PoE device. In some embodiments, a wall outlet near the powered device plugs into the housing 12 at the power supply input 14. Other local power sources can be used, such as batteries. In the present invention, the power source connected to the power supply input 14 must be separate from the power source for the power source equipment and control center. The system 10 operates as a part of an overall system. The collection and transmission of data at remote locations, like at the system 10, are incorporated into the overall network. Power disruptions in one location will not crash the entire network. The system 10 of the present invention adds an uninterruptible power supply (UPS) to PoE devices. Previous networks only have the UPS at the control center to preserve data and avoid disruption. The system 10 of the present invention allows UPS at the remote location of the PoE device.

Figure 2:
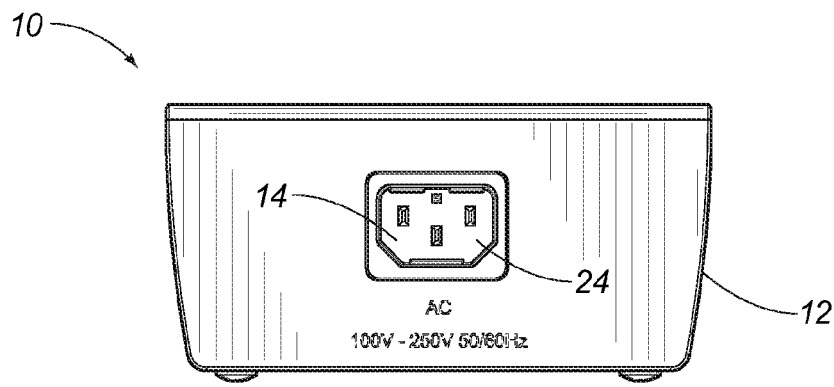
FIG. 2 is an end view of the embodiment of FIG. 1.

On the housing 12, the power supply input 14 is disposed with a Power Supply (PS) interface 24, as shown in FIGS. 1 and 2. The interface 24 is on an outside surface of the housing 12. The interface 24 is compatible as a wall socket connection for a power cord or other extension cord. The cord connects to an AC power source, such as a wall outlet. The AC power source is closer to the powered device than the control center or power source equipment within the network.

Figure 3:
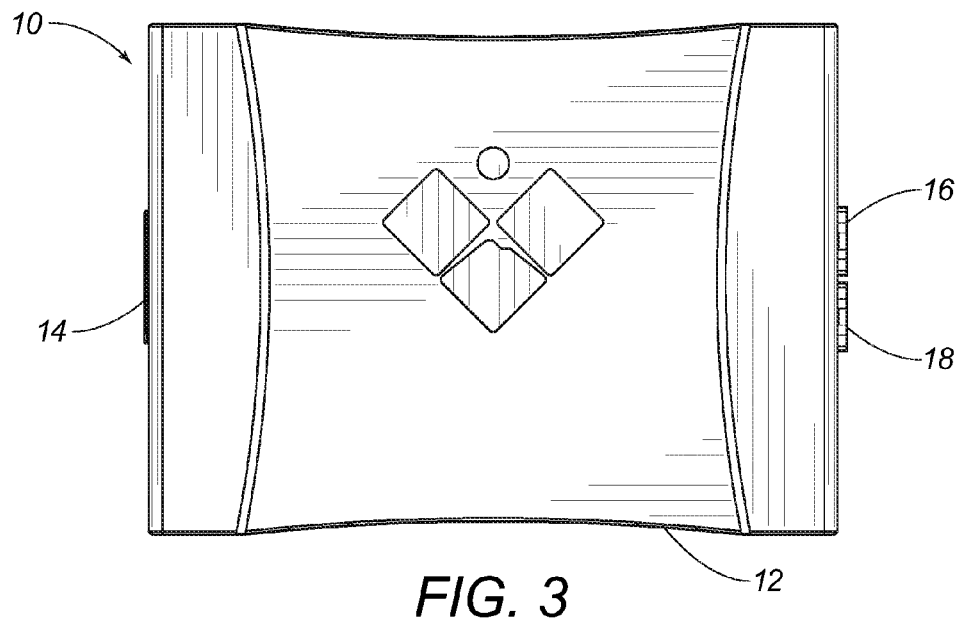
FIG. 3 is a top plan view of the embodiment of FIG. 1.
Figure 4:
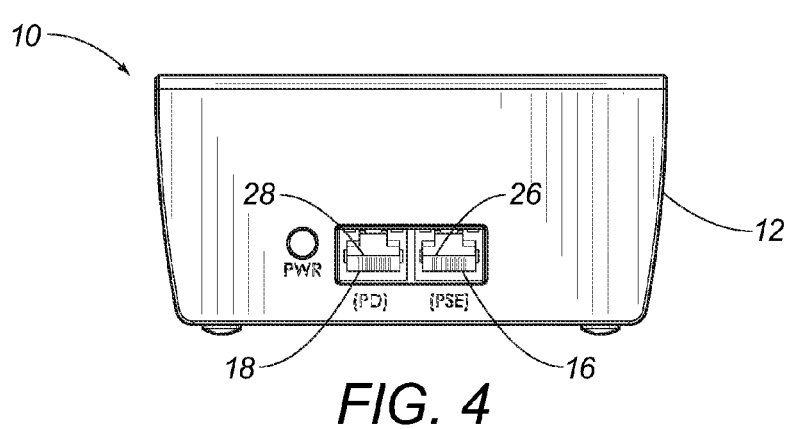
FIG. 4 is an opposite end view of the embodiment of FIG. 1.

FIGS. 3 and 4 show the power source equipment input 16, and the powered device output 18 disposed on the housing 12. The power source equipment input 16 has a power source equipment (PSE) interface 26. The powered device output 18 has a powered device (PD) interface 28. In embodiments of present invention, the PSE interface 26 and the PD interface 28 are Ethernet ports on the outside of the housing 12. Ethernet cables for power and data connect devices to the housing 12 through these interfaces 26 and 28. Other embodiments include auxiliary power supply cable port for either of the PSE interface 26 or PD interface 28. In the embodiments of FIGS. 1-5, the power source equipment input 16 connects power source equipment of the overall network. The power source equipment may include a PoE network switch, a non-PoE network switch, a computer network, and other power and data sources. The power source equipment is part of a data and power network. The power source equipment is not powered by the same power source as the system 10.

Also in the present invention, the powered device output 18 connects a powered device to the system 10. The powered device becomes part of the overall network as well, with transmission of data and power to other power source equipment, such as a control center computer. In the embodiments of FIGS. 1-5, the powered device is a PoE device, such as a wireless router, a network webcam, a voice over Internet Protocol (VoIP) telephone, a wireless access point, a camera, and a data processor. FIG. 6 shows a schematic illustration of the powered device 46. FIG. 6 also illustrates the power source equipment 44. The power source equipment can be comprised of a network and a network cable with at least one network input and network output so as to provide data and power to the power source equipment input 16. The network cable is an Ethernet cable for power and data transmission back and forth. In some embodiments, the network output has cable supply terminals, such as two 22-28 AWG conductor output supply terminals. The network cable transmits and receives data through the power source equipment input 16 to the control module 22 and to the powered device 46.

Figure 5:
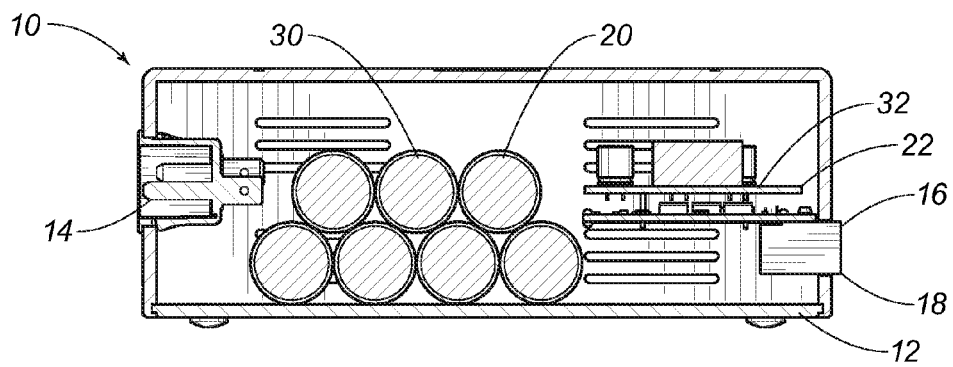
FIG. 5 is a cross-sectional view of an embodiment of the system for supplying uninterruptible power, according to the present invention.
Figure 6:
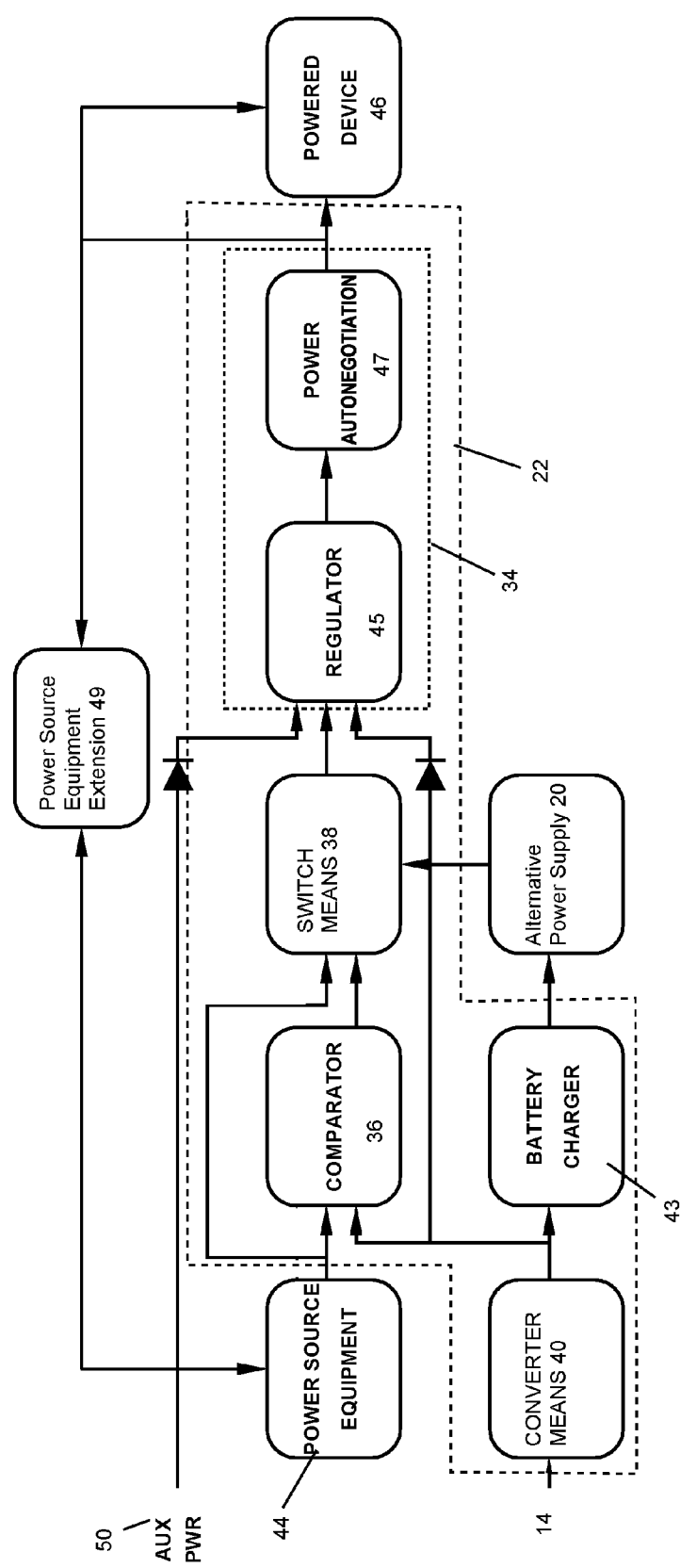
FIG. 6 is a schematic illustration of an embodiment of the system and method for supplying uninterruptible power to a PoE device, according to the present invention.

FIG. 5 shows the embodiments of the alternative power supply 20 disposed within the housing 12. The alternative power supply 20 stores energy for use by the powered device. In some embodiments, the alternative power supply 20 is a battery 30 or plurality of batteries 30, as illustrated in different ways in FIGS. 5 and 6. In some embodiments, the alternative power supply 20 is a lithium ion battery. In the system 10, the alternative power supply 20 stores power from the power supply input 14 or the power source equipment input 16, so that the alternative power supply 20 is ready to supply power, when there is a disruption of the power supply input 14. Thus, the alternative power supply 20 can also be a chemically activated recharging supply, so that the alternative power supply 20 actively stores power supplied by the system 10. For example, the alternative power supply can store the power from the power source equipment input 16 by Ethernet cable and/or from the power supply input 14 by a power cord.

The control module 22 of the embodiments of the present invention is shown in FIG. 5 as disposed within the housing 12. The control module 22 connects the power supply input 14, the power source equipment input 16, the powered device output 18, and the alternative power supply 20 into the system 10. The control module 22 manages the power and data received by the system 10 within the housing 12 and distributes data and power to through the powered device output 18 to the powered device or PoE device. The regulation of the power within the system 10 insures UPS to the powered device. There is direct connection of the system 10 between the power source equipment and the powered device, instead of direction connection of the power source equipment to the powered device. The buffering like activity of the control module 22 preserves the powered device on the overall network and simultaneously allows for the local connection of the power source to the powered device. UPS for a PoE device is possible with the intervention of the system 10 of the present invention. The particular power regulation by the system 10 is beyond the prior art.

Embodiments of the system 10 in FIG. 6 include the control module 22 being comprised of an injector means 34, a comparator means 36, and a switch means 38 on a printed circuit board (PCB) 32. FIG. 7 shows a schematic view. The PCB 32 is disposed within the housing 12. The injector means 34 collects and distributes data and power to the powered device through the powered device output 18. Data and power are managed by the injector means 34 from the power source equipment input 16, the power supply input 14, and the alternative power supply 20 to the powered device output 20. The comparator means 36 detects power from the power supply input 14 and power to the powered device output 18. The comparator means 36 connects the power source equipment input 16 and the power supply input 14 to the switch means 38. The comparator monitors the amounts of power incoming for the powered device 46, whether the power comes from the power supply input 14 or the power source equipment input 18. For UPS, the power from the powered device output 18 must be maintained for operation of the powered device without regard to the source, so that disrupted sources do not disrupt the powered device. In the present invention, the power supply input 14 connects to a power supply separate from the power supply of the power source equipment. The switch means 38 can be a power switch and selects incoming power from either the power supply input 14 as determined by the comparator means 36 or the alternative power supply 20 or the power source equipment input 18 as determined by the comparator means 36 or any combination thereof to the injector means 34 for distribution. The switch means 38 enables UPS so that power through the powered device output 18 is stable for the powered device.

The control module 22 also includes a converter means 40 placed between the injector means 34 and the power supply input 14. When the power source supplies alternating current (AC) to the power supply input 14, the converter means 34 can change the AC to direct current (DC). The DC is compatible with the powered device, and the DC can be distributed from the injector means 34 to the powered device output 18. The control module 22 regulates the power supplied and the power distributed, and the converter means 40 facilitates the conversions between AC and DC. The proper type of power is supplied through the powered device output 18 according to the injector means 34.

Embodiments of the present invention include an active injector means 34 being comprised of a regulator 45 and a power autonegotiation module 47 in communication with the regulator 45. The regulator 45 connects the switch means 38 and the converter means 40 to the power autonegotiation module 47, and the power autonegotiation module 47 connects the regulator 45 to the powered device output 18. Previous embodiments have been classified as "passive injectors" with the power source equipment input determining the amount of power. The system 10 was a pass through for the available PoE power to the powered device 46. In the present invention, auto-negotiation is performed so that the current PoE standard (IEEE 802.3at) can be made compatible with the previous PoE standard IEEE 802.3af. Older equipment and existing cabling can now accommodate the updated and more current PoE powered devices at the remote locations. The power autonegotiation module 47 can set a threshold for the powered device regardless of whether the originating PSE complies with the current standard and upgrades. No matter which type of power source equipment is used, the system 10 will appropriately power the powered device 46 to the required IEEE standards. The active injector means 34 connects the power source equipment input 16 to the powered device 46 so as to distribute data between the power source equipment and the powered device. Additionally, the power autonegotiation module 47 determines a predetermined amount of power for the powered device output 18 according to the powered device 46. The powered device 46 may have different power requirements than the power source equipment connected to the power source equipment input 16. The regulator 45 activates the switch means 38 for the power sources providing the corresponding voltage to the powered device output 18 according to the predetermined amount of power.

According to the monitoring of the comparator means 36, the switch means 38 makes a particular connection between either the power supply input 14, power source equipment input 16, or the alternative power supply 20 according to the regulator 45 commands to the switch means 38. The commands are set by the power autonegotiation module 47 of the injector means 34. Whatever amount of PoE power through the power source equipment input 16, along with the data from the power source equipment, embodiments of the present invention no longer rely on this pass through PoE power for the powered device output 18. The pass through PoE power from the power source equipment input 16 is actively managed by the power autonegotiation module 47 to power the powered device 46, to contribute power to the powered device or to charge the alternative power supply 20.

The system 10 is usually located so far away from the power source equipment that the Ethernet cables are very long. The distance of the Ethernet cabling diminishes the amount of pass through PoE power able to be harnessed at the power source equipment input 16 by the system 10. Embodiments of the present invention include an auxiliary power supply 50 connected to the regulator 45 of the injector means 34. This auxiliary power supply 50 may be a local outlet, similar to the power supply connected to the power supply input 14 or another PoE power source by another power source equipment. The auxiliary power supply 50 present yet another power source for active management by the power autonegotiation module 47 and regulator 45 of the injector means 34.

FIG. 6 also shows the alternative power supply 20. The alternative power supply 20 can be a rechargeable battery or other chemically activated recharging power source. The embodiment of FIG. 6 shows the control module 22 having a batter recharger 43 connected to the converter means 40 and the alternative power supply 20. The battery charger 43 transfers power from at least one of the power supply input 14 and the power source equipment input 16 and stores power in the alternative power supply 20. As another power source, the alternative power supply 20 is no longer limited to pass through PoE power. The power autonegotiation module 47 may demand more power from the alternative power supply 20 than provided and stored from the power source equipment input 16. In the present invention, the alternative power supply 20 can contribute to the threshold PoE power now required by an upgraded powered device 46, regardless of the pass through PoE power from the power source equipment input 16.

The remaining limitation of the power source equipment has been the physical constraints of the existing Ethernet cables. The network cannot be extended due to the inherent limitation of 100 m per segment for CAT-5 based Ethernet cabling. In the present invention, a power source equipment extension 49 is added between the powered device 46 and the power source equipment connected to the power source equipment input 16. The power source equipment extension 49 can be an Ethernet switch, which adds an additional 100 m to the maximum achievable length of the CAT-5 cable, while maintaining 10/100/1000 base-T functionality. The additional Ethernet switch can pass the PoE managed by the control module 22 to a powered device 46 further from the system 10. The power source equipment extension 49, as another power source equipment, can relay the threshold PoE power further to the powered device 46. Other embodiments include the system 10 being compatible Ethernet cabling with PoE over four CAT-5 pairs instead of two CAT-5 pairs. The capacity increases power up to 60 W to be supplied. Although projected capacity has ranged between 12 VDC-24 VDC, the system 10 can also handle greater than 24 VDC, including up to 60 W for modified Ethernet cabling. The fast upgrades to the physical components are good, but existing infrastructure and existing PoE devices cannot be so completely and comprehensively replaced with each upgrade. The injector means 34 of the present invention now accounts for retro-fit networks and future physical upgrades.

Embodiments of the present invention include the method of supplying uninterruptible power to the powered device with the system 10. The power autonegotiation module 47 of the injector means 34 sets a predetermined amount of voltage to the powered device output 18. The predetermined amount of voltage corresponds to the powered device 46. The powered device 46 may require more power than available through the power source equipment connected to the power source equipment input 16. Previous PoE system had to accept the pass through power available PoE along the Ethernet cables. When a powered device 46 is an upgraded or more modern device, the power requirement for this newer PoE device may be different than the existing infrastructure and power source equipment within the network. Next, the power supply input 14 supplies power to the powered device 46 through the regulator 45 of the injector means 34. When power autonegotiation module 47 detects insufficient power at the injector means 34, the regulator 45 activates to collect power for the powered device output 18 from the power supply input 14 and at least one power source. The regulator 45 commands the switch means to connect to at least one power source that is available, including the alternative power supply 20, the converter means 40, and the power source equipment input 16 through the comparator means 36. After activating the regulator, the injector means 34 monitors voltage at the power supply input 14. When sufficient power from the power supply input is detected, the injector means 34 switches power to the powered device output from the at least one power source to the power supply input 14. The brownout of the power supply input 14 no longer disrupts the powered device 46, even at the remote location and network connection. The instantaneous switch and use of PoE power to manage the powered device enables remote cameras and devices to continue to function through local power outages.

In some embodiments, the at least one power source can also be the auxiliary power supply 50 connected to the regulator 45 of the injector means 34. The powered device 46 can be supported actively by the system 10 from different power sources, including the available PoE from the power source equipment in the network. Power can be supplied from the power source equipment input 16, the alternative power supply 20, and the power supply input 14. The method further includes supplying power to the alternative power supply 20 from the power source equipment input 16, which is recharging the battery with PoE, when that PoE is not being used to power the powered device 46. The battery charger 43 can be used between the converter means 40 and the alternative power supply 20 for recharging the alternative power supply 20.

The present invention provides a system and method for supplying uninterruptible power to a PoE device with active power negotiation and extended range. The PoE device at an even more remote location from the power source equipment and control center of the overall network can have UPS with the system of the present invention. The complications of the data and power transmission, volatility of local power sources, and integration of system upgrades are resolved by the present invention. The system can actively set a predetermined amount of power for the powered device output according to the particular powered device. A new or upgraded PoE powered device may require different PoE power than the older and existing Ethernet cables and power source equipment within the network. Retrofitting the older equipment with older capacity is made possible with the active management of the present invention. As networks cannot fully and completely replace the entire infrastructure at once, the system can accommodate the newer components incorporated into the network for PoE power. The power autonegotiation module and regulator control the powered device output and collect the required PoE for the powered device without interruption. Additional sources and additional alternative power sources are now connected and available for UPS with the present system. The present invention further includes a power source equipment extension, such as an Ethernet switch. The Ethernet switch can transmit the required PoE along another length of cable, so that the powered device can be located further from the power source equipment. The network can be extended between the PoE powered device and the system. The control center of the network can be located even further from the powered devices, which still have reliable power.

The foregoing disclosure and description of the invention is illustrative and explanatory thereof. Various changes in the details of the illustrated structures, construction and method can be made without departing from the true spirit of the invention.

We claim:

1. A system for supplying uninterruptible power, comprising:
a housing;
a power supply input disposed within said housing, said power supply input having a power source interface on an outside of said housing;
a power source equipment input disposed within said housing, said power source equipment input having a power source equipment interface on an outside of said housing;
a powered device output disposed within said housing, said powered device output having a powered device interface on an outside of said housing;
an alternative power supply disposed within said housing;
a powered device connected to said powered device output by an Ethernet cable;
power source equipment connected to said power source equipment input, said power source equipment being powered separate from said power supply input and said alternative power supply; and
a control module connected to said power supply input, said power source equipment input, said powered device output, and said alternative power supply,
wherein said control module comprises an injector means, a comparator means, a switch means, and a converter means,
said comparator means detecting power from said power supply input and to said powered device output and connecting said power source equipment input and said power supply input to said switch means,
said converter means providing DC power from AC power from said power supply input and connecting said power supply input to said comparator means, said injector means, and said alternative power supply,
said switch means connecting said comparator means and said alternative power supply to said injector means,
said injector means collecting and distributing power, said injector means being comprised of a regulator and power autonegotiation module, said regulator connecting said switch means and said converter means to said power autonegotiation module, said power autonegotiation module connecting said regulator to said powered device output.

2. The system for supplying uninterruptible power, according to claim 1, wherein said control module further comprises an auxiliary power supply connected to said regulator of said injector means.

3. The system for supplying uninterruptible power, according to claim 1, said alternative power supply being comprised of a chemically activated recharging power source.

4. The system for supplying uninterruptible power, according to claim 1, wherein said control module further comprises a battery charger, said battery charger storing power from at least one of said power supply input and said power source equipment input, said battery charger distributing power to said alternative power supply.

5. The system for supplying uninterruptible power, according to claim 1, further comprising:
a power source equipment extension between said powered device output and said powered device.

6. The system for supplying uninterruptible power, according to claim 5, wherein said power source equipment extension is an Ethernet switch.

7. The system for supplying uninterruptible power, according to claim 5, wherein said power source equipment extension connects said power source equipment to said powered device.

8. The system for supplying uninterruptible power, according to claim 1, said converter means receiving power from an AC power source and transmitting converted DC power to said control module, said converter means being connected between said power supply input and said injector means so as to provide DC power from an AC source connected to said power supply input.

9. The system for supplying uninterruptible power, according to claim 1, wherein said power source equipment is comprised of a network and a network cable with at least one network input and network output so as to provide data and power to said power source equipment input, and wherein said network output is comprised of a cable supply terminals, said cable supply terminals being two 22-28 AWG conductor output supply terminals.

10. The system for supplying uninterruptible power, according to claim 1, wherein said injector means connects said power source equipment input to said powered device so as to distribute data and power between said power source equipment and said powered device, said power autonegotiation module determining a predetermined amount of power for said powered device output, said regulator activating said switch means, said switch means providing voltage to said powered device output according to said predetermined amount of power.

11. The system for supplying uninterruptible power, according to claim 10, further comprising:
an auxiliary power supply connected to said regulator of said injector means, said regulator collecting power from said auxiliary power supply.

12. The system for supplying uninterruptible power, according to claim 10, said regulator collecting power form said converter means.

13. The system for supplying uninterruptible power, according to claim 1, said injector means distributing power to said powered device at a distribution range greater than 24 VDC.

14. A method of supplying uninterruptible power, said method comprising:
providing a system according to claim 1;
setting a predetermined amount of voltage to said powered device output with said power autonegotiation module;
supplying power from said power supply input to said powered device through said regulator of said injector means;
detecting insufficient power at said injector means by said power autonegotiation module;
activating said regulator to collect power for said powered device output from said power supply input and at least one power source selected from a group consisting of said alternative power supply, said converter means, and said power source equipment input through said comparator means;
monitoring voltage at said power supply input after the step of activating said regulator;
detecting sufficient power from said power supply input with said regulator; and
switching power to said powered device output from said at least one power source.

15. The method of supplying uninterruptible power, according to claim 14, wherein said system further comprises an auxiliary power supply connected to said regulator of said injector means, said regulator collecting power from said auxiliary power supply, and
wherein said at least one power source is selected from a group consisting of said alternative power supply, said converter means, said power source equipment input through said comparator means, and said auxiliary power supply, in the step of activating said regulator.

16. The method for supply uninterruptible power, according to claim 14, further comprising the step of:
supplying power from said power source equipment input to said powered device through said injector means.

17. The method for supply uninterruptible power, according to claim 14, further comprising the step of:
supplying power from said power source equipment input to said alternative power supply through said switch means.

18. The method for supply uninterruptible power, according to claim 14, wherein said system further comprises a battery charger, said battery charger storing power from at least one of said power supply input and said power source equipment input, said battery charger distributing power to said alternative power supply, the method further comprising the step of:
supplying power from said power supply input to said alternative power supply through said battery charger.

* * * * *